(12) United States Patent
Soundararajan (10) Patent No.: US 6,805,815 B1
(45) Date of Patent: Oct. 19, 2004

(54) COMPOSITION FOR SHIELDING RADIOACTIVITY

(75) Inventor: Rengarajan Soundararajan, West Plains, MO (US)

(73) Assignee: Hanford Nuclear Service, Inc., West Plains, MO (US)

( * ) Notice: Subject to any disclaimer, the term of this patent is extended or adjusted under 35 U.S.C. 154(b) by 827 days.

(21) Appl. No.: 09/775,359

(22) Filed: Feb. 1, 2001

Related U.S. Application Data (60) Provisional application No. 60/210,393, filed on Jun. 9, 2000, provisional application No. 60/206,853, filed on May 24, 2000, and provisional application No. 60/206,888, filed on May 24, 2000.

(51) Int. Cl.⁷ .............................. C09K 3/00; G21C 7/24; G21F 1/10
(52) U.S. Cl. ................. 252/478; 250/517.1; 250/518.1; 524/712; 524/780
(58) Field of Search ...................... 252/478; 250/517.1, 250/518.1; 524/712, 780

(56) References Cited

U.S. PATENT DOCUMENTS

| | | |
|---|---|---|
| 3,949,026 A | 4/1976 | Devillard |
| 4,092,398 A | 5/1978 | Miyake et al. |
| 4,591,455 A | 5/1986 | Macedo et al. |
| 4,628,837 A | 12/1986 | Mori et al. |
| 4,636,335 A | 1/1987 | Kawamura et al. |
| 4,654,172 A | 3/1987 | Matsuda et al. |
| 4,816,187 A | 3/1989 | Larson et al. |
| 4,959,181 A | 9/1990 | White et al. |
| 5,075,045 A * | 12/1991 | Manchak et al. ............... 588/6 |
| 5,401,824 A | 3/1995 | Clatty et al. |
| 5,545,796 A | 8/1996 | Roy et al. |
| 5,786,611 A | 7/1998 | Quapp et al. |
| 5,789,648 A | 8/1998 | Roy et al. |
| 6,030,549 A | 2/2000 | Kalb et al. |

* cited by examiner

Primary Examiner—Matthew A. Thexton
(74) Attorney, Agent, or Firm—Blackwell Sanders Peper Martin LLP (57) ABSTRACT

A urethane based polymer composition is provided that exhibits superior shielding properties during and after exposure to high level radiation. The composite is formed by mixing a liquid isocyanate monomer, preferably 4,4'-diisocyanate monomer with a liquid phenolic resin, preferably phenol formaldehyde resin, and a phosphate ester flame retardant. An optional pyridine catalyst may be added to shorten the cure time. The resulting composition cures at room temperature and can be utilized in several manners, including spraying or pouring the composition prior to curing over radioactive material to prevent leakage of radiation. The uncured composite can be sprayed on the walls of a room or container to prevent leakage of radiation and can also be used to contain radiation prior to demolition. The uncured composite can also be molded into bricks or panels for use in construction. In a preferred embodiment, the polymer composition further incorporates radioactive waste, namely depleted uranium oxide, and can be used in conjunction with specially designed containers for storing radioactive material. The resulting polymer/waste composition cures at room temperature and does not deteriorate or suffer structural damage when exposed to higher levels of gamma radiation, nor do the mechanical or chemical properties undergo any detectable change. The composition is resistant to biodegradation and combustion, and does not creep or shrink during thermal cycling.

19 Claims, 7 Drawing Sheets

COMPOSITION FOR SHIELDING RADIOACTIVITY

This application claims the benefit of U.S. Provisional Application Ser. No. 60/206,853 filed May 24, 2000; U.S. Provisional Application Ser. No. 60/206,888 filed May 24, 2000; and U.S. Provisional Application Ser. No. 60/210,393 filed Jun. 9, 2000.

FIELD OF THE INVENTION

The present invention relates generally to a composition and method for shielding radioactivity and, more particularly, to a modified urethane/phenolic resin polymer composition shielding material capable of encapsulating and stabilizing nuclear waste within a polymeric matrix, and methods for using the polymer composition. Nuclear waste generated by the nuclear energy industry must be immobilized for safety and environmental reasons. The polymer composition of the present invention effectively immobilizes nuclear waste in the polymeric matrices safely and in a cost-effective manner. Further, when depleted uranium is the waste incorporated in the polymeric matrix, the polymer composition is a highly effective radiation shielding material that can be stored or utilized for secondary applications.

BACKGROUND OF THE INVENTION

The tremendous growth in the nuclear energy industry demands the need for safe, cost effective immobilization of wastes generated. Nuclear power generation is dependent on enriched uranium-235 fuel. Given the natural abundance of the U-235 isotope is 0.7%, large quantities of uranium-238 isotope, known as depleted uranium, remain after processing. As there is very little demand for this isotope, U-238 is stockpiled.

One Department of Energy storage site in Paducah, Kentucky has 700,000 tons of depleted uranium in storage. Depleted uranium is a very low radiation source, but is very toxic and environmentally hazardous. Further, transportation to other storage sites is not feasible for economic and safety reasons.

In addition, the depleted uranium waste, which is stored underground, is often kept under heavy mineral oil to prevent atmospheric oxidation and subsequent combustion. The oil is known to be contaminated with polychlorinated biphenyls (PCBs), trichloroethylene (TCE), tetrachloroethane (TCA), and methylethylketone (2-propanone). This mixture cannot be treated by conventional stabilization techniques.

Treatment of radioactive waste is often further complicated by the presence of metal ions in the waste. Chemical fixation processes for containing hazardous waste containing metal ions have been accepted and used as viable alternatives to traditional remediation techniques, as these processes are relatively simple to implement and are cost effective. However, conventional methods of containment of the chemically immobilized waste have been shown to be ineffective.

Further, several isotopes that may be present in radioactive waste, such as Cs-137 and Sr-90 are of great value in treating diseases, sterilizing surgical tools, and food preservation. Therefore, an immobilization process that would allow the immobilization medium to be dissolved, if desired, to recover the radio nuclides therein is preferred.

Conventional stabilization/solidification techniques using cement grout have been successfully used to contain certain heavy metal contaminants, typically lead and mercury, but do not perform successfully when the total organic content exceeds about 3%. At high levels of organic compounds, which is common in the radioactive waste industry, any final product made with cement will remain in paste form, which is unacceptable under Emergency Response Disposal Facility (ERDF) criteria.

In addition, radioactive isotopes cause structural damage to cement based binders. Vitrification of the cement based binders provides a glassy matrix which is not self healing, increasing leaching problems.

In-situ vitrification technology requires metallic uranium to be converted into a uranium compound. Solubility limitations lead to large volume increases making this method economically infeasible. Further, vitrification provides only partial remediation of waste, typically about 8% of the clear liquids.

Solvent washing techniques also result in a very large volume of secondary waste streams, contaminated with radionuclides. Further, when the uranium has been completely washed of oily organics, the metallic uranium, which is pyrophoric, will spontaneously ignite. The final product therefore does not meet non-leachability and non-pyrophorocity ERDF criteria In addition to treating/remediating nuclear waste, there is a great need for improved shielding materials, both for use in storing treated radioactive wastes and for the protection of personnel and instrumentation in facilities which utilize radioactive materials.

Conventional shielding materials include cement-based products and organic polymers. Cement products provide some protection, but have a low hydrogen atomic density, a measure of a materials' ability to shield radiation. Specialty types of cement that incorporate an increased volume of water, resulting in higher hydrogen densities are available. Unfortunately, the amount of bonded water tends to decrease with time, causing a reduction in shielding ability, and the improvement in performance does not justify the increased expense.

Polyethylene is a commonly used polymer shielding material because of its high hydrogen atomic density, but requires a neutron absorbing material, usually boron. Polyethylene also has a low specific weight or density, and is typically used in combination with a layer of concrete or lead.

It is therefore an object of the present invention to provide a polymer material with improved shielding characteristics.

It is a further object of the present invention to provide a polymer composition and method that effectively immobilizes, both chemically and mechanically, radioactive waste materials.

Yet a further object of the present invention is to provide a polymer composition that incorporates depleted uranium to produce a moldable polymer composition which exhibits excellent radiation shielding properties.

It is another object of the present invention to provide a polymer composition that resists structural damage from heavy doses of radiation, primarily gamma radiation.

Yet another object of the present invention is to provide a polymer composition that produces excellent leaching characteristics after exposure to radioactivity.

A further object of the present invention is to provide a polymer composition that retains good mechanical properties after exposure to high level radiation.

Still a further object of the present invention is to provide a polymer composition that does not undergo biodegradation, corrosion in acidic environment, or exhibit damage due to weathering.

Yet a further object of the present invention is to provide a polymer composition that does not release combustible gas when exposed to high level radiation.

Another object of the present invention is to provide a polymer composition that will safely and economically store depleted uranium waste.

Still another object of the present invention is to provide a method of safely treating depleted uranium waste that has been stored under heavy mineral oil, Yet another object of the present invention is to provide a method of treating radioactive waste that will remove all wastes, including solids, semi-solids, and organics to provide total remediation.

Yet a further object of the present invention is to provide improved containers for use in storing radioactive waste materials.

SUMMARY OF THE INVENTION

To accomplish the foregoing and other objects of the invention there are provided the following compositions and methods.

A urethane based polymer composition, composite, or blend is provided. The composition is formed by mixing a liquid isocyanate monomer and a liquid phenolic resin with a phosphate ester flame retardant at room temperature until a homogeneous mixture is formed. Presently preferred are diphenylmethane 4,4'-diisocyanate monomer and phenol formaldehyde resin. The presently preferred flame retardant is a halogenated phosphate ester. The resulting composition cures without heating in approximately 6–18 hours depending on environmental conditions.

A catalyst may be utilized in applications where a short curing time is necessary. Phenylpropyl pyridine is presently used as a catalyst, reducing the composition cure time to about 20 minutes, depending on environmental conditions.

In a preferred embodiment of the present invention the polymer further incorporates radioactive waste. The solutions of monomers, including diphenylmethane 4,4'-diisocyanate and phenol aldehyde resin are mixed at room temperature with the waste to be immobilized until a homogeneous mixture is formed. The resulting polymer/waste composition cures in 6–8 hours depending on environmental conditions. The resulting composition does not deteriorate or suffer structural damage when exposed to higher levels of gamma radiation, nor do the mechanical or chemical properties undergo any detectable change. The composition is resistant to biodegradation and combustion, and does not creep or shrink during thermal cycling.

In one of the preferred embodiments, the waste that is encapsulated into the polymer matrix is depleted uranium. In a preferred composition, a mixture of about 6% of the liquid monomer defined above and about 94% depleted uranium in powder form is mixed until homogeneous. The mixture is then allowed to cure at room temperature. The cured polymer composition provides excellent radiation shielding characteristics, without damage to the polymer matrix or leaching of the radioactive material. When depleted uranium or other low level radioactive material is incorporated, this composition solves two problems. The composition deals with a problematic waste material and provides a useful product.

When the waste to be mixed with the polymer of the present invention contains metal ions, chemical fixation to prevent leaching is necessary. The governing properties of an effective chemical immobilization have been shown to include the solubility product constant and the partition coefficient of the final waste form. The anions, selected based on Ksp (solubility product constant), are mixed with the waste to affect chemical fixation prior to the waste being mixed with the liquid monomers.

The shielding composition may be utilized in several manners. The monomers can be mixed and the resulting solution sprayed or poured, prior to curing, over the radioactive material, in order to contain the material and prevent leakage of radiation. In addition, the uncured composition can be sprayed on the walls of a room or container to prevent leakage of radiation, and can also be used to contain radiation prior to demolition. Further, the polymer composition can be molded to produce bricks or panels that may be utilized as part of the construction of a containment vessel or room.

In a preferred use, the polymer is utilized in a thermal desorption/polymer based immobilization method to safely deal with U-238 stored under contaminated mineral oil. In this process, the oil and other organic material is distilled off at reduced pressure in the presence of the inert gas helium. The distilled oil and vapors are combusted in a high efficiency burner. The combustion products are further oxidized by a series of catalytic oxidizers. The off-gases are scrubbed chemically, filtered and the helium is recycled. The uranium metal is cooled in the helium atmosphere and then immobilized with the radiation shielding polymer of the present invention. Fire hazards are eliminated as all the processes are conducted in a helium or flame retardant atmosphere at room temperature.

A preferred construction using the polymer composition as an integral part of a radiation containment vessel is a double walled stainless steel container. The void between the two walls is filled with the polymer composition material. The containers include a solar photo electric cell panel which will provide electricity for cooling fans to circulate air and dissipate any heat produced. Corrosion is prevented by the use of sacrificial electrodes, which are attached to each container.

BRIEF DESCRIPTION OF THE DRAWINGS

For a better understanding of the present invention, reference may be made to the accompanying drawings in which.

DETAILED DESCRIPTION OF THE INVENTION

The polymer composition of the present invention is a thermoset urethane based polymer which is the result of the polymerization of two monomer solutions. The first monomer utilized is an aromatic isocyanate polymer. Presently preferred is polymeric diphenylmethane 4,4'-diisocyanate (polymeric MDI), in a solution of high boiling point aromatic hydrocarbon solvents, principally C10, produced by Ashland Chemical Co., Columbus, Ohio.

The presently preferred second monomer is a phenolic resin which is the result of the polycondensation of phenol with formaldehyde. The phenolic resin is in a solution of high boiling point aromatic hydrocarbon solvents, principally C10, produced by Ashland Chemical Co. When mixed together, the resulting polymer composition cures in 6–8 hours, depending on environmental conditions.

A catalyst may be added to shorten the cure time. The percentage of catalyst added can also be adjusted to customize the cure time for a particular application. Presently preferred is a solution containing phenylpropyl pyridine, produced by Ashland Chemical Co., which can shorten the cure time to about 20 minutes, depending on environmental conditions. It is of note that the composition cures at room temperature, and the addition of additional heat does not effect the curing rate.

The resulting polymer composition is combustible. The thermal behavior of the polymer composition is modified by incorporating a phophate ester in the composition, rendering the composition fireproof. Presently preferred is a flame-retardant reagent comprised of a halogenated phosphate ester, by Great Lakes Chemical Corp., West Lafayette, Ind., sold under the brand name Firemaster 836™.

The polymer composition is formed by mixing the two monomer solutions and the flame retardant with a conventional paddle mixer until a homogenous mixture is formed, with optimal results being achieved with about 30 minutes mixing. If a catalyst is utilized, the components must be quickly mixed until homogenous, as curing is complete in as little as 6 minutes depending on the percentage of catalyst used and environmental conditions. The cure time decreases with an increase in the quantity of catalyst utilized, to a maximum of about 0.5% catalyst.

The final polymer composition preferably includes about 25 to 75% of the isocyanate monomer, about 20 to 70% of the phenolic resin, and about 3 to 10% of the flame retardant compound. Most preferred is about 40% of isocyanate monomer, about 54% of phenolic resin, and about 6% of flame retardant compound. The ratio of isocyanate monomer to phenolic resin is determined by the physical characteristics desired in the final polymer composition. The higher the ratio of phenolic resin, the more flexible the final composition will be.

For applications where the addition of the catalyst is desired, the polymer material includes about 25 to 75% of isocyanate monomer, about 20 to 75% of phenolic resin, about 3 to 10% halogenated phosphate ester flame retardant compound, and about 0.10 to 1.0% pyridine catalyst. Above 1.0%, there is no appreciable increase in the cure rate to justify the added cost. Most preferred is about 40% isocyanate monomer, about 54% phenolic resin, about 5.85% halogenated phosphate ester flame retardant, and about 0.15% pyridine catalyst.

The resulting polymer composition is fireproof even when heated above 1000° F. with a direct bunsen flame. The polymer composition of the present invention does not ignite, but only smolders as long as held over the flame. Even the gaseous products formed during this thermal process were not combustible, in part because with a typical polymer loading of 6.0%, and a hydrogen content of 4.0%, the overall hydrogen content of the polymer composition is less than one percent (0.24%).

This polymer composition material can be advantageously mixed with depleted uranium, which may contain $U_3O_8$, $UO_3$, $UO_2$, metallic uranium and mixtures thereof, to form a radiation shielding material. For mixing depleted uranium or other low level radioactive materials, conventional cement mixers with paddle type stirrers may be utilized. High loadings of uranium oxide, from about 80–96% uranium oxide, can be utilized. The percentage of uranium oxide utilized will effect the texture of the composition prior to curing. High loadings of about 94% result in a sand like material prior to curing, whereas lower loadings of about 91% result in a pourable mixture similar to wet concrete prior to curing.

As the oxide is coated with the liquid composition solution during mixing, there is no free flowing polymeric liquid available during the polymerization of the composition. Therefore, there is no settling or stratification, providing homogenous cured products of uniform density.

The preferred depleted uranium/polymer material includes about 1.2 to 15% isocyanate monomer, about 1.0 to 14% phenolic resin, about 80 to 96% depleted uranium and about 0.2 to 1.0% halogenated phosphate ester flame retardant compound. Most preferred is about 2.4% isocyanate monomer, about 3.6% phenolic resin, about 93.4% depleted uranium and about 0.6% halogenated phosphate ester flame retardant. The percentage of flame retardant is limited in that at higher percentages, the polymer becomes dilute, resulting in stratification of the final polymer/uranium oxide composition.

For applications where the addition of the catalyst is desired, the depleted uranium/polymer material includes about 1.2 to 15% isocyanate monomer, about 1.0 to 14% phenolic resin, about 80 to 96% depleted uranium, about 0.2 to 1.0% halogenated phosphate ester flame retardant compound, and about 0.1 to 1.0% pyridine catalyst. Most preferred is about 2.4% isocyanate monomer, about 3.6% phenolic resin, about 93.25% depleted uranium, about 0.6% halogenated phosphate ester flame retardant, and about 0.15% pyridine catalyst.

The cured polymer composition of the present invention has an unconfined compressive strength of 12,500 psi. When the composition includes depleted uranium, the compositions exhibit an unconfined compressive strength of 3,000 to 6,000 psi, depending on the percent of depleted uranium used. In testing compositions containing 80–96% uranium oxide, it was determined that the unconfined compressive strength decreased with increased loading of uranium oxide.

It was also determined that the composition density increased, and the viscosity decreased, with uranium oxide content, and that the 72 hour modulus of elasticity is $1.11 \times 10^6$ psi. Negligible off gasing was observed for three hours at a substantially steady rate, tapered off at 16 hours, and was not observed at 72 hours. All testing was carried out utilizing appropriate ASTM procedures.

The resulting polymer compositions can be utilized in various applications, including the containment of radioactive waste. The uncured polymer solution can be poured over or sprayed over the waste. As the polymer cures, the polymer forms a shield that contains radiation. Further, as the radiation does not cause any deterioration in the mechanical characteristics of the polymer, the risk of any leakage is greatly reduced.

The polymer compositions can also be utilized for radiation containment during demolition of facilities which have become contaminated with radioactive material. The uncured polymer solution is sprayed onto the contaminated surfaces, whereupon when cured, the radioactive material is fixed to the surfaces. The method acts to protect the personnel as well as the environment.

Another use for the polymer composition is as a moldable radiation shielding material. When the composition includes about 91% depleted uranium oxide, a smooth dough-like material is formed prior to curing. The composition can be molded into bricks or panels which can be utilized in the construction of reactors or other facilities. The composition can also be formed as an integral part of a container for storing radioactive material, as described in more detail below.

The polymer composition of the present invention provides an excellent containment medium for waste containing metal ions. It has been determined that the polymer composition alone cannot bring about immobilization of metal ions. However, both radioactive and non-radioactive metals can be chemically immobilized. The principles of precipitation/solution chemistry govern the leaching of the metal ions. When a stabilized monolith comes in contact with a groundwater system, the stabilized species attain an equilibrium with the water surrounding the monoliths. For each metal ion present in the waste to be encapsulated, suitable reagents must be selected based on the Ksp value of the resultant metal ion compound.

An example is $Co^{2+}$ which can be converted into $Co_3(PO_4)_2$ by the addition of the appropriate reagents. In the event a monolith containing $Co_3(PO_4)_2$ comes into contact with water, the $Co_3(PO_4)_2$ ionizes until it attains the following equilibrium:

$$\underset{\text{solid at equilibrium}}{Co_3(PO_4)_2} \rightleftarrows \underset{\text{ions in solution}}{3Co^{3+} + 2PO_4^{3-}} \quad (1)$$

$$\frac{[Co^{2+}]^3 [PO_4^{3-}]^2}{[\underset{\text{solid}}{Co_3(PO_4)_2}]_1} = (\text{constant}) \ K \quad (2)$$

Since the concentration of a solid is considered as unity, we now get a new constant $Ksp$ known as solubility product constant:

$$Ksp = [Co^{2+}]^3 [PO_4^{3-}]^2 \quad (3)$$

The value of $Ksp$ has been experimentally determined to be:

$2.0 \times 10^{-35}$ for $Co_3(PO_4)_2$ (i.e.) $(Co^{2+})^3 [PO_4^{3-}]^2 = 2.0 \times 10^{-35}$ During our immobilization we had kept the concentration of $PO43$ at 0.1 mole/l.
Substituting this value in equation (3) we get:

$$[Co^{2+}] = \sqrt[3]{\frac{2.0 \times 10^{-35}}{[0.1]^2}}$$
$$= 1.26 \times 10^{-11} \text{ moles/kg.}$$

Since the atomic weight of cobalt is 58, the amount of Co in one liter will be $1.26 \times 10^{-11} \times 58 \text{ g/kg.} = 7.3 \times 10^{-10} \text{ g/kg.}$
$= 73.0 \text{ parts per trillion (ppt)}$ The leach data illustrated in Example 3 below confirms that the radio nuclides and other metal ions can be chemically immobilized and then contained in the preferred polymeric matrix of the present invention.

In addition to metal ions, radioactive waste is often further contaminated by organic material. A primary goal of the present invention is to provide a useful product from the tons of stored depleted uranium waste which are currently being stockpiled. Unfortunately, depleted uranium waste in the form of turnings, chips, and in some cases sludge, is kept under heavy mineral oil to prevent atmospheric oxidation and subsequent combustion of the uranium. The oil is known to be contaminated with polychlorinated biphenyls (PCBs), trichloroethylene (TCE), tetrachloroethane (TCA), and methylethylketone (2-propanone). This mixture cannot be treated by conventional stabilization techniques.

Figure 3:
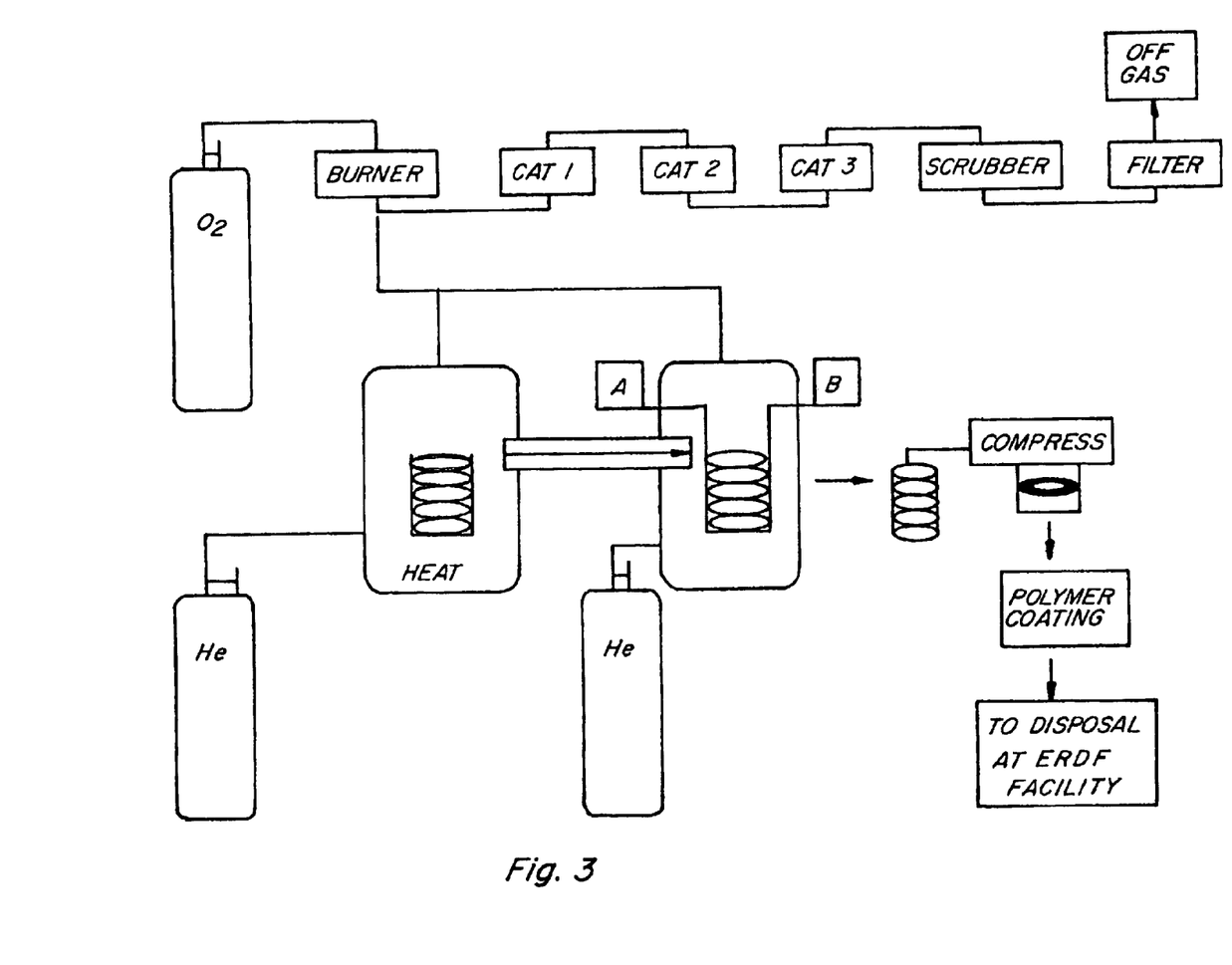
FIG. 3 is a schematic illustrating one embodiment of a method for remediation of contaminated wastes.

The following volume reduction and containment process, further illustrated in the schematic of FIG. 3, has been developed to process this type of waste:

Phase 1: Using robotic systems and hydraulic drills, the tank waste solids and liquids will be homogenized, and the resultant slurry will be pumped into the thermal desorption unit. Thermal desorption is a United States E.P.A. approved technology which is widely utilized in the waste management industry. The thermal desorption process warrants caution due to the presence of heavy, long chain hydrocarbons and pyrophoric uranium turnings in the waste. The waste will be subjected to low temperature thermal desorption at reduced pressures, under helium. This will remove the organic material present in the waste, as well as any water, as water vapor, at low temperature.

Since almost all the organic matter is removed by thermal desorption at low temperature, the presence of oxidizers such as nitrates and nitrites will not cause any violent or explosive reactions. The dry solid residue will then be pyrolyzed to yield metal oxides, for example:

$2M(NO_3)_2 \rightarrow 2MO + 4NO_2 + O_2$

The oxygen will oxidize organic salts present, such as oxalates to carbon dioxide:

$2CaC_2O_4 \rightarrow 2CaCO_3 + 2CO_2$

The nitrogen dioxide produced by the pyrolysis is reduced to ammonia by the off gas treatment system and scrubbed as ammonium phosphate.

$NO_2 \rightarrow NH_3$ $2NH_3 + H_3PO_4 \rightarrow (NH_4)2HPO_4$

All of these scrubber products meet the requirement for the disposal at an ERDF site. Volume reduction rates on simulated waste systems were between 40:1 and 25:1. The only gaseous product from the dry oxide waste is Helium, which can be released through a valve system.

Phase 2: The organics from Phase 1 vapors are catalytically oxidized to carbon dioxide and hydrogen halides. Catalytic oxidation is an E.P.A. approved technique.

$C_xH_yX_z \rightarrow XCO_2 + y/2H_2O + zHX$ $2HX + Ca(OH)_2 \rightarrow CaX_2 + H_2O$ $CO_2 + Ca(OH)_2 \rightarrow CaCO_3 + H_2O$ The water vapor from phase 1 will be cooled and collected in a condenser. Should metal ions such as $Se^{2+}$, $Cs^+$, $Hg^{2+}$, or $Zn^{2+}$ be present, they will be removed by multiple-pass reverse osmosis system. The pure water can be disposed of on site and the concentrated metal ions and the filter (usually polyamide) will be contained with the solid waste from Phase 1 pyrolysis.

Phase 3: If necessary, criticality issues will be addressed before the final pyrolysis and, should it become necessary, inert aluminal ($Al_2O_3$) can be added as a diluent.

Phase 4: The final waste form, which is a dry solid oxide mixture, will be placed inside stainless steel containers on the ground level. A preferred container is illustrated in FIG. 4.

Figure 4:
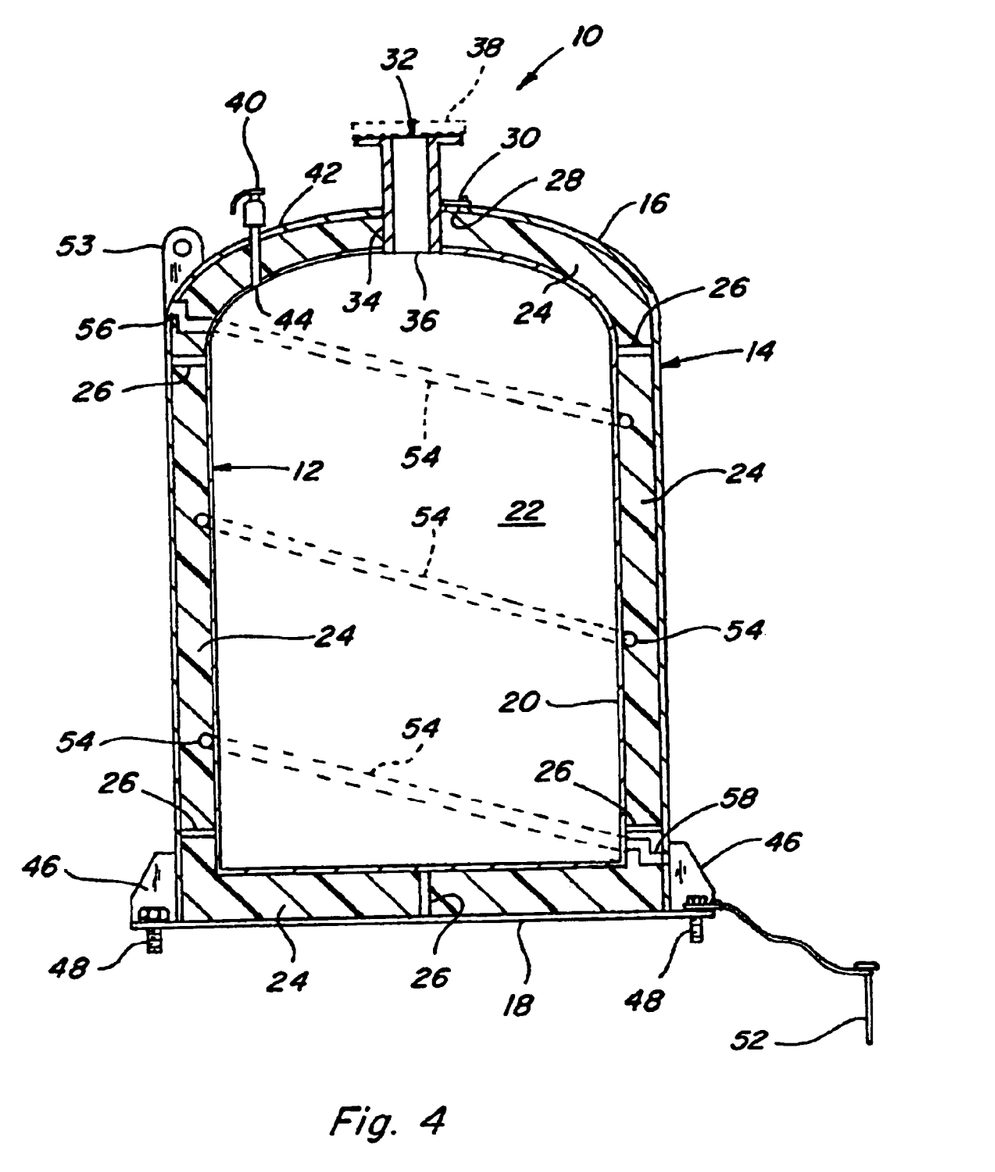
FIG. 4 is a cross-sectional view of a preferred embodiment of the radioactive waste containment vessel of the present invention.

A preferred construction for a 25 cubic foot storage container is illustrated in cross-section in FIG. 4. The container 10 includes an inner liner 12 and an outer jacket 14, both made of 304 L stainless steel or some other acceptable metal, plastic or composite material. The outer jacket 14 includes an upper portion 16 and a base portion 18. The interior wall 20 of the inner liner 12 defines the storage compartment 22 of the container 10.

In a preferred embodiment, the inner liner 12 is approximately ⅜" thick and the outer jacket 14 is approximately ¼" thick. The substantially uniform void defined as the space between the inner liner 12 and outer jacket 14 is filled with the polymer composition of the present invention to form the polymer shielding layer 24. The distance marked "A" between the outer jacket 14 and the inner liner 12, that is, the thickness of the polymer layer 24, is determined by the level of radiation to be stored. A general formula for determining the necessary thickness of the polymer layer 24 is $I_d = I_0 \exp(-ux)$, where $I_d$ is the level of outside shielding, $I_o$ is the source strength, u is the mass attenuation coefficient and x is the thickness of the shield.

The inner liner 12 is held in place relative to the outer jacket 14 by support brackets 26 or any other suitable means. It is also recognized that the inner liner 12 and outer jacket 14 including upper portion 16 and base portion 18 could be integrally formed into a one piece unit. The outer jacket 14 includes a polymer fill aperture 28 through which the polymer composite is introduced into the container 10 to form the polymer layer 24, and a polymer fill cap 30 for closing and sealing the aperture 28. A fill nozzle 32 extends through apertures 34 and 36 of the outer jacket 14 and inner liner 12 respectively, and allows for the waste to be placed into the storage compartment 22. The fill nozzle 32 includes a cap 38 which is preferably welded into place after the waste is placed into the storage compartment 22. Any number of fill apertures 28 and nozzles 32 could be associated with the container 10.

A gas pressure release valve 40 extends through apertures 42 and 44 of the outer jacket 14 and inner liner 12 respectively. The valve 40 prevents a dangerous build up of pressure within the storage compartment 22.

The outer jacket 14 further includes base support flange 46 through which anchor lugs 48 may be installed for permanent storage on a concrete pad (not shown). In addition, sacrificial electrodes 52 may be attached to base support flange 46 to prevent corrosion of the container 10. The electrodes 52 are replaceable and are typically buried with the container 10. Presently preferred for a 25 cubic foot container is the use of four (4) anchor lugs 48 and one (1) sacrificial electrode 52, preferably made of aluminum or zinc. The outer jacket 14 further includes optional lifting lugs or handles 53 to facilitate moving the container.

The container 10 may also include a cooling system as many of the waste materials being stored are not only radioactive but also thermally hot. Temperatures of up to 350° F. have been recorded. In the presently preferred embodiment, the cooling system includes convection heat removal channels 54 which are likewise preferably 304 L stainless steel tubes, or some other acceptable material. The channels or tubes 54 are generally welded or otherwise attached directly to the outside of inner liner 12 in the space formed between the inner liner 12 and the outer jacket 14 and spiral around the inner liner 12 to create a natural convection flow to reduce radiated heat. The portion of the channels 54 that extends around the portion of the inner liner 12 shown in FIG. 4 is shown in broken outline form. The channels 54 communicate with a respective heat vent 56 located at or near the upper portion 16 of the container 10. The heat vent 56 exits the container in a stair step or non-linear manner so as not to compromise the radiation shielding capacity of the polymer layer 24.

At the base end 58 of the heat removal channels 54, the channels 54 are in communication with one or more fans (not shown) which are powered by one or more solar photo electric cells or other appropriate power means (not shown). The fan(s) blow air into and through the channels 54 thereby removing any heat generated by the waste stored in the storage compartment 22 of container 10 through convection. Cool air enters the respective channels 54 at the bottom 58 of each channel 54 and flows upward and exits through the heat vent 56. While only one channel 54 is shown in FIG. 4 for purposes of illustration, four channels 54 are generally preferred for a 25 cubic foot container.

Table 1 illustrates one set of the dimensions and parameters for various sizes of storage containers.

TABLE 1

| Storage Size | Height | Interior Diameter | Outer Diameter | Inner Liner Thickness | Outer Jacket Thickness | Optional Number of Heat Vents | Number of Sacrificial Electrodes | Polymer Layer Thickness |
|---|---|---|---|---|---|---|---|---|
| 150 ft³ | 90" | 72" | 85¼ | ½ | ¼ | 6 | 3 | 6¾ |
| 75 ft³ | 78¼" | 36" | 49¼ | ½ | ¼ | 4 | 3 | 6 |
| 25 ft³ | 56 + 2A | 36" | 37¼+ 2A | ⅜ | ¼ | 4 | 1 | x |
| 10 ft³ | 34½+ 2A | 28" | 29 + 2A | ⅜ | ¼ | 3 | 1 | x |
| 5 ft³ | 28 + 2A | 22" | 23 + 2A | ¼ | ¼ | 3 | 1 | x |
| 2 ft³ | 20¾+ 2A | 16" | 17 + 2A | ¼ | ¼ | 2 | 1 | x |
| 2 L | 8 + 2A | 8" | 9 + 2A | ⅛ | ⅛ | 0 | 0 | x |

All measurements in inches. The thickness of the polymer layer is determined by $I = I_0 \exp(-ux)$ as discussed above.

Figure 5:
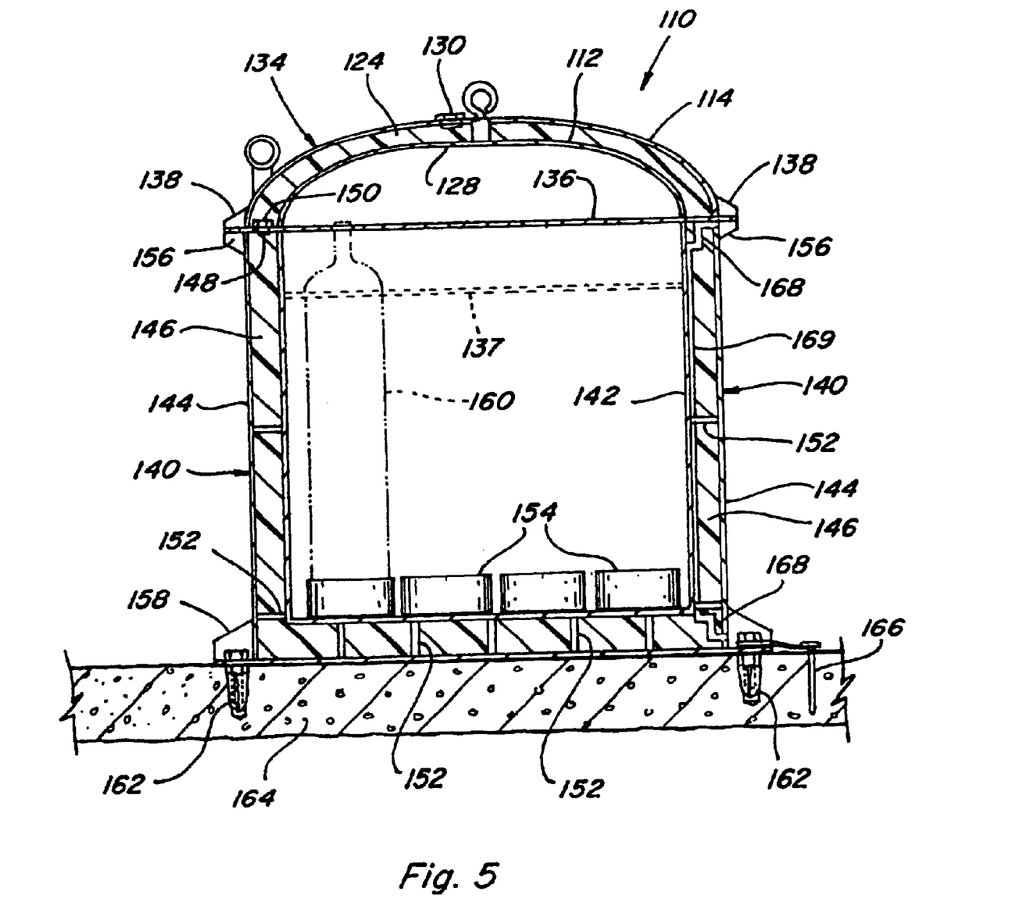
FIG. 5 is a cross-sectional view of a preferred embodiment of a radioactive waste containment vessel for storing one or more unshielded waste storage canisters.

An alternative waste storage container 110 is illustrated in FIG. 5 in which twelve (12) conventional 25 cubic foot canisters 160 are housed for a total of 300 cubic feet of waste storage. The container 110 includes a cover portion 134 having an inner liner 112, an outer jacket 114 and a polymer layer 124. The cover portion 134 further includes a polymer fill aperture 128 and polymer fill cap 130 to allow the polymer to be introduced into the cover 134, and a flange 138 to facilitate securing the cover in place. The cover portion 134 may also include a canister positioning grate 136 through which the tops of the canisters 160 extend when the cover 134 is in place to prevent the canisters 160 from tipping over or hitting each other. Additional positioning grates or other holding means 137 may be positioned within the container space to further secure the stability of the individual canisters 160 therewithin. The grates 136 and 137 include appropriate openings or apertures for holding and containing the canisters 160 when positioned therewithin.

The body 140 of the container 110 includes an inner liner 142, an outer jacket 144, a polymer layer 146, a polymer fill aperture 148, and polymer fill cap 150. The inner liner 142 and outer jacket 144 are held in place relative to one another by support brackets 152 or other suitable means, or the members 142 and 144 could be integrally formed as a one-piece unit with the base portion of the container. A plurality of canister securing sleeves 154 are positioned and located on the base portion of the container as illustrated in FIG. 5, each sleeve 154 being adapted to receive the bottom portion of one of the canisters 160. The sleeves 154 likewise help prevent movement of the canisters 160 once placed within the sleeves 154. The outer jacket 144 includes a corresponding flange 156 for securing the cover 134 in place by bolting, welding or otherwise securing the cover flange 138 and the body flange 156 together. It is recognized and anticipated that the use of any combination of the grates 136 and 137 and the sleeves 154 may be used to adequately hold the respective canisters 160 in stable position within the container 110. It is also recognized and anticipated that any other suitable means for accomplishing this task may likewise be utilized. Still further, it is recognized that the cover portion 134 may likewise be fabricated so as to be pivotally attachable to the body 140.

The body outer jacket 144 further includes base support flange 158 through which anchor lugs 162 may be installed for permanent storage on a concrete pad 164. In addition, sacrificial electrodes 166 may be attached to the flange 158 to prevent corrosion of the container 110 as previously explained. Presently preferred for this container embodiment is the use of four (4) support flanges 158 and associated anchor lugs 162 and three (3) sacrificial electrodes 166, preferably made of aluminum or zinc. The container 110 further includes heat vents 168 in communication with a heat removal channel 169 through which air can circulate, or through which air can be pumped by a solar cell powered fan (not shown) or other means, to cool the container 110. The channel 169 can be a tube or channel member attached directly to the outside of inner liner 142, although other members and fabricating processes to achieve this end can likewise be used. Unlike the channels 54, the channel 169 extends upwardly in a substantially vertical direction adjacent the inner liner 142. The heat vents 168 exit the container in a stair step or non-linear manner similar to heat vents 56 so as not to compromise the radiation shielding capacity of the polymer layer 146. Although only one channel 169 is illustrated in FIG. 5, it is recognized that any plurality of channels 169 may be spaced around the outside of inner liner 142 to provide adequate cooling to the container 110. It is also recognized that a cooling system similar to the heat removing channels 54 illustrated in FIG. 4 may be used in conjunction with container 110 as well as any other suitable means for convectively reducing any radiated heat which may occur within the container 110.

Figure 6:
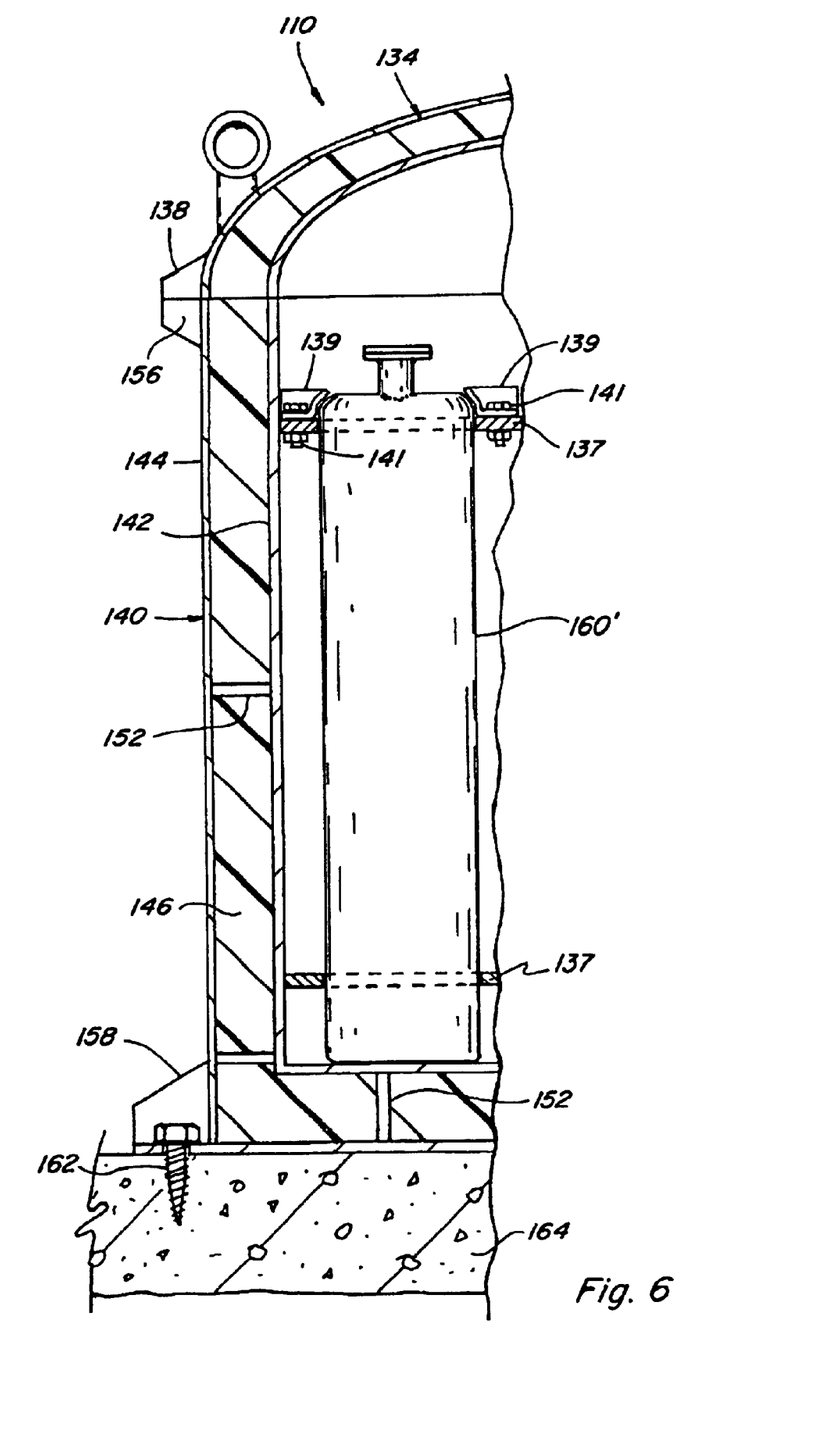
FIG. 6 is a partial cross-sectional view similar to FIG. 5 illustrating another method for securely holding the waste storage canisters within the containment vessel.

FIG. 6 illustrates another method for adequately holding a plurality of canisters 160' within the container 110. In the embodiment illustrated in FIG. 6, the canister securing sleeves 154 and the canister positioning grate 136 illustrated in FIG. 5 have been eliminated and, instead, the individual canisters 160' are held in proper position within the container 110 through the use of a pair of grates 137 positioned and located as illustrated in FIG. 6. The grates 137 in FIG. 6 are substantially identical to the grate 137 illustrated in FIG. 5 and include appropriate openings or apertures for holding and containing canisters 160' when positioned therewithin. In addition, the canisters 160' are further secured by one or more lock down tabs or hold down bars 139 which are positioned and located adjacent the upper portion of each canister 160' as illustrated in FIG. 6. The lock down tabs 139 can be contoured to mate with the upper portion of a respective canister 160' as shown in FIG. 6 and each lock down tab or bar 139 is fixedly attached to the upper grate 137 via one or more fastening members such as the fastening members 141. The hold down tabs or bars 139 are positioned so as to either engage or lie substantially close to the respective canister 160' so as to prevent movement thereof. Although any plurality of hold down tabs or bars 139 may be used in association with each canister 160', it is anticipated that the use of three tabs 139 circumferentially spaced around the top portion of each canister 160' will be sufficient to adequately hold and secure such canisters in place. In this regard, the upper and lower grates 137 will be typically manufactured out of stainless steel and will be of sufficient thickness, based upon the size of the respective canisters 160', so as to sufficiently hold and secure the canisters within container 110. It is also recognized and anticipated that the position and location of the upper and lower grates 137 may be adjusted vertically depending upon the size and shape of the respective canisters 160'. In addition, the size and shape of the hold down tabs or bars 139 may likewise vary depending upon the position of the upper grate 137 relative to the top portion of the canister 160' as well as the specific shape of the canister 160'.

Figure 7:
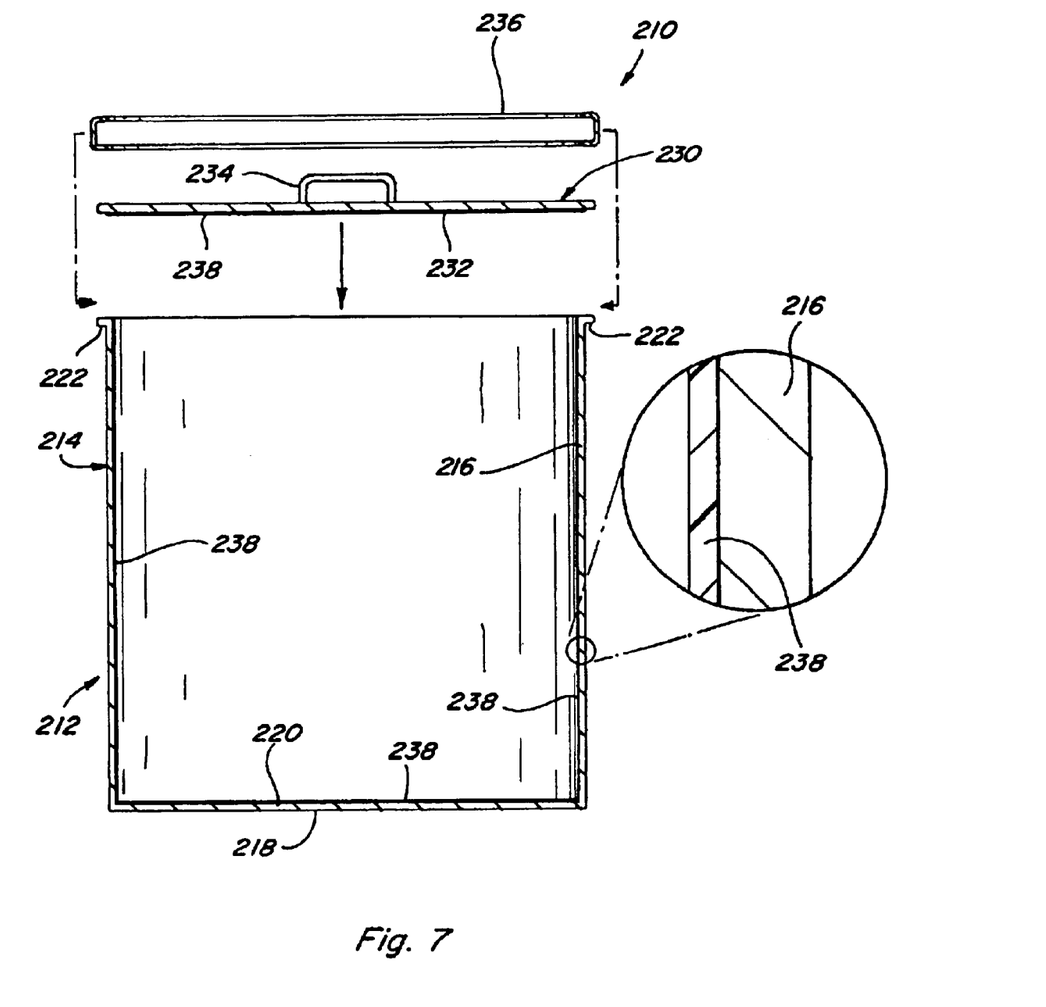
FIG. 7 is a cross-sectional view of a preferred embodiment of a radioactive waste containment vessel for use with low level radioactive waste.

FIG. 7 illustrates a 12-gauge type 304 L stainless steel container 210 for use in applications where the radioactive waste to be stored is classified as low level radiation waste. The container body 212 includes a cylindrical wall 214 having an interior surface 216, a base portion 218 having an interior surface 220, and a flange 222. The container 210 further includes a cover 230 having an interior surface 232 and a handle 234. Any suitable fastening method such as a common barrel clamp 236 may be used to secure the cover 230 to the container body flange 222 when the cover 230 is operatively positioned over the container body 212. Alternatively, the cover 230 may be welded to the container body flange 222 after the waste to be stored is introduced into the container body 212. Other attachment methods are recognized and anticipated. It is also recognized that the container 210 may take on a wide variety of other shapes other than the circular shape disclosed in FIG. 7.

The interior surfaces 216, 220 and 232 are all coated with a layer of the shielding polymer of the present invention to form a polymer layer 238 prior to the introduction of the waste to be stored. The shielding polymer is preferably sprayed onto the interior surfaces 216, 220 and 232 by a sprayer system in which the two components of the polymer composition, the isocyanate monomer and the phenolic resin, are introduced through separate sprayer supply tubes and mixed as sprayed. By introducing a catalyst as the polymer components are sprayed, the composition cures as it coats the interior surfaces 216, 220 and 232 of the container. The thickness of the sprayed polymer is preferably 10–25 microns.

Various examples of the present polymer composition are set forth below.

EXAMPLE 1

Polymer Composition

COMPONENT A
Pepset 1, HNS I by Ashland Chemical of Dublin, Ohio.

| | Cas No. | % by weight |
|---|---|---|
| Phenol Formaldehyde Resin | 9003-35-4 | 40.0–55.0 |
| Dioctyl Adipate | 103-23-1 | 10.0–20.0 |
| Phenol | 108-95-2 | 1.0–10.0 |
| Aromatic Petroleum Distillates | 64742-95-6 | 1.0–13.0 |
| Dimethyl Glutarate | 1119-40-0 | 7.0–22.0 |
| Dimethyl Adipate | 627-93-0 | 1.0–11.0 |
| Dimethyl Succinate | 106-65-0 | 1.0–11.0 |
| 1,2,4-Trimethylbenzene | 95-63-6 | 1.0–9.0 |

COMPONENT B
Pepset 2, HNS II by Ashland Chemical of Dublin, Ohio.

| | Cas No. | % by weight |
|---|---|---|
| Polymeric MDI | 9016-87-9 | 30.0–40.0 |
| Methylene Diphenyldiisocyanate | 101-68-8 | 25.0–35.0 |
| Dioctyl Adipate | 103-23-1 | 1.0–9.0 |
| Trimethyl-1,3-Pentanediol Diisobutyrate | 6846-50-0 | 1.0–10.0 |
| Aliphatic Petroleum Distillates | 64742-47-8 | 1.0–10.0 |
| Aromatic Petroleum Distillates | 64742-40-5 | 1.0–5.0 |
| Methylene Diphenylisocyanate | 26447-40-5 | 1.0–5.0 |
| 1,2,4-Trimethylbenzene | 95-63-6 | 1.0–3.0 |

COMPONENT C
phenylpropyl pyridine, Ashland Chemical of Dublin, Ohio.

| | Cas No. | % by weight |
|---|---|---|
| Pyridine Derivative | 2057-49-0 | 10.0–30.0 |
| Dimethyl Glutarate | 1119-40-0 | 40.0–60.0 |
| Dimethyl Adipate | 627-93-0 | 5.0–20.0 |
| Dimethyl Succinate | 106-65-0 | 5.0–20.0 |

A polymer composition was produced by mixing 4 kg of component A with 5.4 kg of component B in a stainless steel reaction vessel using a Hobart type paddle mixer until thoroughly mixed. Component C was added, 600 g, and mixing continued until a homogeneous mixture was formed. The resulting mixture was formed into bricks by compression in a brick layers dye, which was placed over an ultrasonic vibrator to prevent any air bubbles from being trapped within the brick. The polymer brick was then allowed to cure at room temperature. The bricks were removed from the molds after curing.

EXAMPLE 2

Uranium Oxide/Polymer Composition

The polymer composition components A and B are as defined in Example 1. The components were mixed in a well polished stainless steel vessel with a Hobart paddle type mixing device, under a vented hood to protect the technician. Component A 3.0 kg and Component B 3.0 kg were added to the mixer, and mixed for approximately 60 minutes at 60–100 rpm until the two liquids were thoroughly mixed. A total of 96.0 kg uranium oxide in the forms of $UO_2$, $UO_3$ $U_3O_8$, and metallic Uranium was then added in increments of 5.0 g under continuous mixing until a homogeneous mixture was formed after about 60 minutes. The mixing took place in a well-ventilated area with air filtration, protective clothing, and gas masks for the workers.

Without the addition of a catalyst, the uranium oxide polymer composition cured after 18 hours. Prior to curing, the composition was a smooth dough-like material suitable for casting. The material was formed into bricks by compression in a brick layers dye, which was placed over an ultrasonic vibrator to prevent any air bubbles from being trapped within the brick. The uranium oxide/polymer brick was then allowed to cure at room temperature. The bricks were removed from the molds after curing.

The resulting cured uranium oxide/polymer composition exhibited the following characteristics:

Unconfined compressive strength 5000 psi (ASTM#D1635 (UCS));
Permeability near zero, thermal cycling (ASTM#D5084-90 between −40° C. and +60° C.)—No change in properties;
Non-combustible (ASTM#D3278-78);
Non-bio-degradable;
Non-corrosive (ASTM#SW846-1110);
Specific gravity (between 8–9 grams/CC) can be increased further by substituting depleted uranium powder for the oxide.
Insulator, electrical conductivity;
Fluxual Strength (ASTM#D1635-87);
Freeze/Thaw (ASTM#D4842-90);
Wet/Dry (ASTM#D4843).

EXAMPLE 3

Metal Ion/Polymer Composition

A ten-kilogram quantity of clean Ottawa sand was spiked with a solution containing arsenic, cadmium, cobalt, chromium, copper, nickel, lead and zinc. The solution was produced by mixing nitrates of the metal ions (supplied by T. J. Baker) named above to yield a solution containing 1000 ppm of each metal ion. The solution was prepared with distilled deionized water. An aliquot of the solution was added to the sand resulted in a matrix containing 1000 ppm(mg/kg) of the metals listed. After oven drying at 105° C. the samples were analyzed using a Varian AA-1275/ GTA95 Spectrometer to confirm the presence of the metals. The following reagents were added to effect chemical fixation of the metals:

1. Sodium Phosphate (stoichiometric quantity+10% reagent) commercial grade-supplied by Fischer Scientific.
2. Sodium Sulfide (stoichiometric quantity+10% reagent) commercial grade-supplied by Fischer Scientific.
3. Ferric Chloride (stoichiometric quantity+10% reagent) commercial grade-supplied by Fischer Scientific.
4. Slag Powder (1% by weight) supplied by commercial cement manufacturers.

Multiple monoliths were made containing 16.5% by weight of a polymer composition solution containing about 60% component A, as defined above and about 40% component B as defined above, and 83.5% by weight of the spiked Ottawa sand. The components were mixed thoroughly with a Hobart-type mixer for homogeneity. The samples were cast into cylindrical monoliths 4 inches tall and 2 inches in diameter, and allowed to cure for 18 hours at room temperature. A set of samples was sent for radiation studies to Pacific Northwest Laboratories (PNL), Richland, Wash. At PNL, the samples were exposed to a total of 110 million ($1.1 \times 10^8$) rads with $Co^{60}$ as the source.

Post Irradiation Testing

The licensing requirements for land disposal of radioactive wastes were originally designed for the stabilization and solidification of low level radioactive wastes contained in cement matrixes. Although the organic polymer matrix used in this investigation does not fit well in this category (cementitious inorganic binders), in the absence of any pertinent regulation, the only available protocols are 10 CFR 61, which have been adopted for evaluation herein.

Evaluation of Leach Characteristics by ANS 16.1

After exposure, both nonirradiated and irradiated samples were subjected to FTIR analyses and American Nuclear Society Leach Test (ANS 16.61) at RMC Environmental Laboratory, West Plains, Mo., the research contract laboratory for the United States Environmental Protection Agency's (EPA) Office of Research and Development (ORD), Cincinnati, Ohio. The results of the ANS 16.1 tests are illustrated in the leach data given in tables 2 through 9. This data clearly illustrates that two major requirements of this immobilization technology, namely chemical fixation followed by placing the immobilized species in a radiation resistant composition matrix have been satisfactorily met.

TABLE 2

ANS 16.1 Incremental Leach Data Total Irradiation 1.1E08R Initial Contaminant Levels 1000 PPM

| Hours | Sample 1 | | Sample 2 | | Sample 3 | |
|---|---|---|---|---|---|---|
| | As Irr. PPM | As Non-irr. PPM | As Irr. PPM | As Non-irr. PPM | As Irr. PPM | As Non-irr. PPM |
| 2 | BDL | | BDL | | BDL | |
| 7 | BDL | | BDL | | BDL | |
| 24 | BDL | BDL | BDL | BDL | BDL | BDL |
| 48 | BDL | BDL | BDL | BDL | BDL | BDL |
| 72 | BDL | BDL | BDL | BDL | BDL | BDL |
| 120 | BDL | BDL | BDL | BDL | BDL | BDL |
| 168 | BDL | BDL | BDL | BDL | BDL | BDL |

BDL—Below Detection Level

TABLE 3

ANS 16.1 Incremental Leach Data Total Irradiation 1.1E08R Initial Contaminant Levels 1000 PPM

| Hours | Sample 1 | | Sample 2 | | Sampl 3 | | Average | |
|---|---|---|---|---|---|---|---|---|
| | Cd Irr. PPM | Cd Non-irr. PPM | Cd Irr. PPM | Cd Non-irr. PPM | Cd Irr. PPM | Cd Non-irr. PPM | Cd Irr. PPM | Cd Non-irr. PPM |
| 2 | 0.37 | | 0.35 | | 0.19 | | 0.303 | |
| 7 | 0.6 | | 0.41 | | 0.24 | | 0.417 | |
| 24 | 0.46 | 2.2 | 0.64 | 3.24 | 0.44 | 2.1 | 0.513 | 2.513 |
| 48 | 0.35 | 0.46 | 0.5 | 0.69 | 0.3 | 0.37 | 0.383 | 0.507 |
| 72 | 0.41 | 0.25 | 0.24 | 0.37 | 0.27 | 0.27 | 0.307 | 0.297 |
| 120 | 0.28 | 0.42 | 0.49 | 0.65 | 0.31 | 0.51 | 0.360 | 0.527 |
| 168 | 0.2 | 0.31 | 0.35 | 0.3 | 0.2 | 0.24 | 0.250 | 0.283 |

TABLE 4

ANS 16.1 Incremental Leach Data Total Irradiation 1.1E08R Initial Contaminant Levels 1000 PPM

| Hours | Sample 1 | | Sample 2 | | Sample 3 | | Average | |
|---|---|---|---|---|---|---|---|---|
| | Co Irr. PPM | Co Non-irr. PPM | Co Irr. PPM | Co Non-irr. PPM | Co Irr. PPM | Co Non-irr. PPM | Co Irr. PPM | Co Non-irr. PPM |
| 2 | 0.68 | | 0.63 | | 0.36 | | 0.557 | |
| 7 | 1.3 | | 1 | | 0.64 | | 0.980 | |
| 24 | 1.28 | 5.06 | 1.52 | 7.9 | 1 | 4.5 | 1.267 | 5.820 |
| 48 | 0.85 | 0.98 | 1.31 | 1.2 | 0.72 | 0.82 | 0.960 | 1.000 |
| 72 | 0.65 | 0.4 | 1 | 0.59 | 0.62 | 0.52 | 0.757 | 0.503 |
| 120 | 0.73 | 0.8 | 1.2 | 1.12 | 0.87 | 0.92 | 0.933 | 0.947 |
| 168 | 0.58 | 0.46 | 0.88 | 0.48 | 1.34 | 0.32 | 0.933 | 0.420 |

TABLE 5

ANS 16.1 Incremental Leach Data Total Irradiation 1.1E08R Initial Contaminant Levels 1000 PPM

| Hours | Sample 1 | | Sample 2 | | Sample 3 | |
|---|---|---|---|---|---|---|
| | Cr Irr. PPM | Cr Non-irr. PPM | Cr Irr. PPM | Cr Non-irr. PPM | Cr Irr. PPM | Cr Non-irr. PPM |
| 2 | BDL | | BDL | | BDL | |
| 7 | BDL | | BDL | | BDL | |
| 24 | BDL | BDL | BDL | BDL | BDL | BDL |
| 48 | BDL | BDL | BDL | BDL | BDL | BDL |
| 72 | BDL | BDL | BDL | BDL | BDL | BDL |
| 120 | BDL | BDL | BDL | BDL | BDL | BDL |
| 168 | BDL | BDL | BDL | BDL | BDL | BDL |

BDL—Below Detection Level

TABLE 6

ANS 16.1 Incremental Leach Data Total Irradiation 1.1E08R Initial Contaminant Levels 1000 PPM

| Hours | Sample 1 | | Sample 2 | | Sample 3 | | Average | |
|---|---|---|---|---|---|---|---|---|
| | Cu Irr. PPM | Cu Non-irr. PPM | Cu Irr. PPM | Cu Non-irr. PPM | Cu Irr. PPM | Cu Non-irr. PPM | Cu Irr. PPM | Cu Non-irr. PPM |
| 2 | 0.11 | | 0.04 | | 0.03 | | 0.060 | |
| 7 | 0.07 | | 0.02 | | 0.02 | | 0.037 | |
| 24 | 0.06 | 0.08 | 0.04 | 0.13 | 0.001 | 0.1 | 0.034 | 0.103 |
| 48 | 0.12 | 0.08 | 0.07 | 0.09 | 0.07 | 0.11 | 0.087 | 0.093 |
| 72 | 0.07 | 0.07 | 0.09 | 0.09 | 0.07 | 0.07 | 0.077 | 0.077 |
| 120 | 0.07 | 0.14 | 0.11 | 0.15 | 0.08 | 0.14 | 0.087 | 0.143 |
| 168 | 0.08 | 0.08 | 0.1 | 0.07 | 0.06 | 0.08 | 0.080 | 0.077 |

TABLE 7

ANS 16.1 Incremental Leach Data Total Irradiation 1.1E08R Initial Contaminant Levels 1000 PPM

| Hours | Sample 1 | | Sample 2 | | Sample 3 | | Average | |
|---|---|---|---|---|---|---|---|---|
| | Ni Irr. PPM | Ni Non-irr. PPM | Ni Irr. PPM | Ni Non-irr. PPM | Ni Irr. PPM | Ni Non-irr. PPM | Ni Irr. PPM | Ni Non-irr. PPM |
| 2 | 1.06 | | 1.07 | | 0.6 | | 0.910 | |
| 7 | 2.21 | | 1.43 | | 0.81 | | 1.483 | |

TABLE 7-continued

ANS 16.1 Incremental Leach Data Total Irradiation 1.1E08R
Initial Contaminant Levels 1000 PPM

| | Sample 1 | | Sample 2 | | Sample 3 | | Average | |
|---|---|---|---|---|---|---|---|---|
| Hours | Ni Irr. PPM | Ni Non-irr. PPM | Ni Irr. PPM | Ni Non-irr. PPM | Ni Irr. PPM | Ni Non-irr. PPM | Ni Irr. PPM | Ni Non-irr. PPM |
| 24 | 1.9 | 5.96 | 2.66 | 12.2 | 1.62 | 6.2 | 2.060 | 8.120 |
| 48 | 1.2 | 1.3 | 1.93 | 1.7 | 1.2 | 1.1 | 1.443 | 1.367 |
| 72 | 0.87 | 0.6 | 1.52 | 0.93 | 0.93 | 0.75 | 1.107 | 0.760 |
| 120 | 0.96 | 1.1 | 1.77 | 1.8 | 1.21 | 1.34 | 1.313 | 1.413 |
| 168 | 0.74 | 0.8 | 1.32 | 0.87 | 1 | 0.61 | 1.020 | 0.760 |

TABLE 8

ANS 16.1 Incremental Leach Data Total Irradiation
1.1E08R Initial Contaminant Levels 1000 PPM

| | Sample 1 | | Sample 2 | | Sample 3 | |
|---|---|---|---|---|---|---|
| Hours | Pb Irr. PPM | Pb Non-irr. PPM | Pb Irr. PPM | Pb Non-irr. PPM | Pb Irr. PPM | Pb Non-irr. PPM |
| 2 | BDL | | BDL | | BDL | |
| 7 | BDL | | BDL | | BDL | |
| 24 | BDL | BDL | BDL | BDL | BDL | BDL |
| 48 | BDL | BOL | BDL | BDL | BDL | BDL |
| 72 | BDL | BDL | BDL | BDL | BDL | BDL |
| 120 | BDL | BDL | BDL | BDL | BDL | BDL |
| 168 | BDL | BDL | BDL | BDL | BDL | BDL |

BDL—Below Detection Level

TABLE 9

ANS 16.1 Incremental Leach Data Total Irradiation 1.1E08R
Initial Contaminant Levels 1000 PPM

| | Sample 1 | | Sample 2 | | Sample 3 | | Average | |
|---|---|---|---|---|---|---|---|---|
| Hours | Zn Irr. PPM | Zn Non-irr. PPM | Zn Irr. PPM | Zn Non-irr. PPM | Zn Irr. PPM | Zn Non-irr. PPM | Zn Irr. PPM | Zn Non-irr. PPM |
| 2 | 0.13 | | 0.16 | | 0.15 | | 0.147 | |
| 7 | 0.19 | | 0.12 | | 0.08 | | 0.130 | |
| 24 | 0.16 | 0.35 | 0.19 | 0.62 | 0.13 | 0.31 | 0.160 | 0.427 |
| 48 | 0.22 | 0.17 | 0.22 | 0.2 | 0.12 | 0.16 | 0.187 | 0.177 |
| 72 | 0.11 | 0.12 | 0.19 | 0.15 | 0.09 | 0.13 | 0.130 | 0.333 |
| 120 | 0.17 | 0.2 | 0.27 | 0.32 | 0.14 | 0.26 | 0.193 | 0.260 |
| 168 | 0.15 | 0.14 | 0.15 | 0.1 | 0.1 | 0.1 | 0.133 | 0.113 |

TABLE 10

Unconfirmed Compressive Strength

| Sample ID | Psi | Average Psi |
|---|---|---|
| Non irradiated | | |
| #1 | 4760 | |
| #2 | 5340 | 5110 |
| #3 | 5210 | |
| Irradiated | | |
| #1 | 4990 | 5066 |
| #2 | 5180 | |
| #3 | 5030 | |

TABLE 11

Biodegradation Data
10 CFR 61 Compliance Data

| Property | Result |
|---|---|
| Flammability combustion Characteristics | After the addition of flame retardant (6% by weight) no sustained combustion at 900° C. |
| Corrosivity | No corrosion in HCl atmosphere |
| Weathering | No observable changes |
| Thermal Cycling between −40° C. and 60° C. | No creep shrinkage |
| Biodegradation | No change |
| UCS after biodegradation | Does not allow the growth of bacteria or microorganism on surface |

The post-irradiation leach data reveals that even after heavy doses ($1.1 \times 10^8$ R), the composition matrix did not undergo significant deterioration. In some cases, for example $Cu^{2+}$, the leach numbers for the irradiated samples actually showed improvement. It is hypothesized that rearrangements in the matrix after irradiation may result in tighter bonding.

Figure 1:
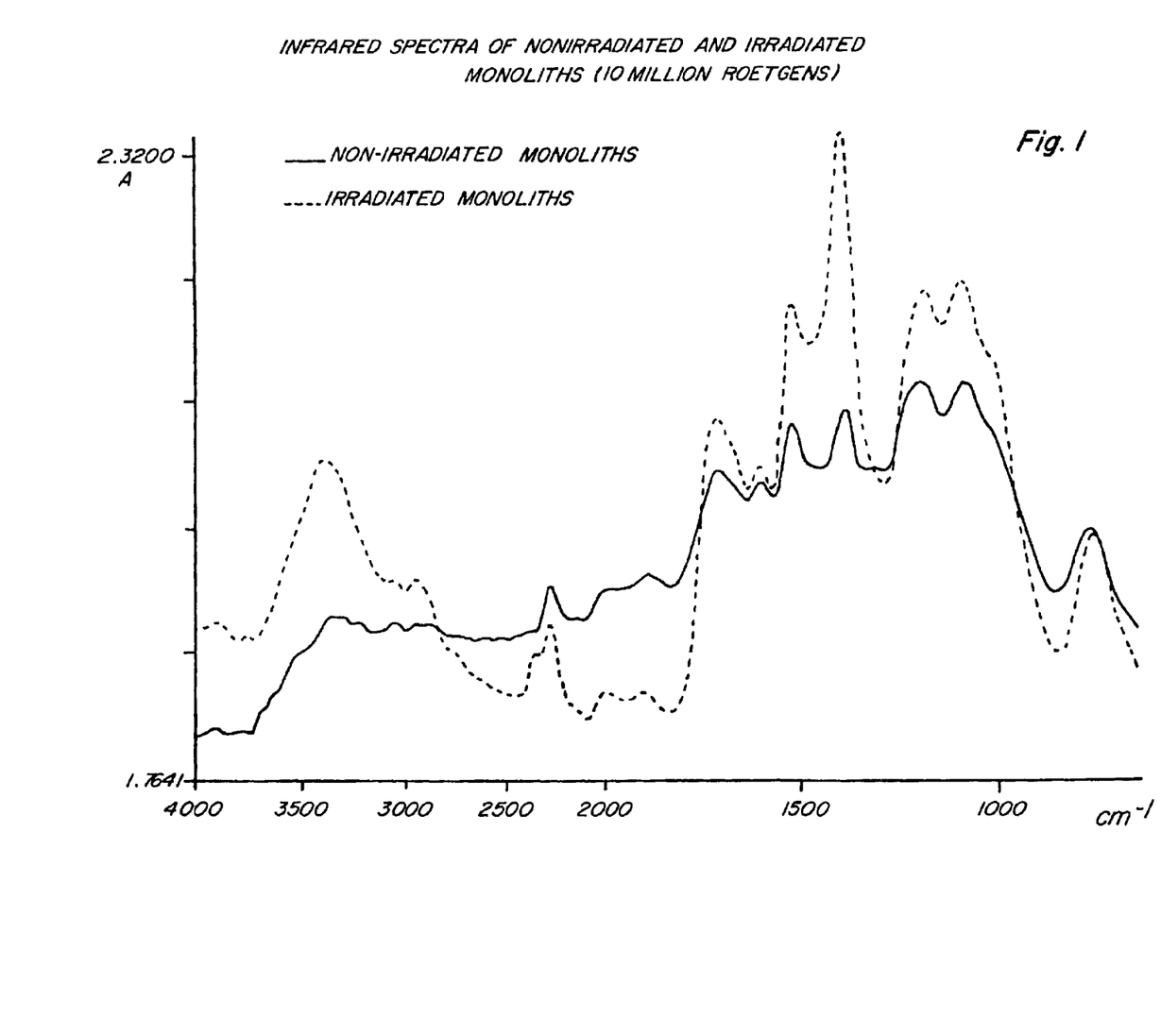
FIG. 1 and FIG. 2 illustrate the Infrared Spectra of Nonirradiated and Irradiated Monoliths (10 and 110 million roentgens)
Figure 2:
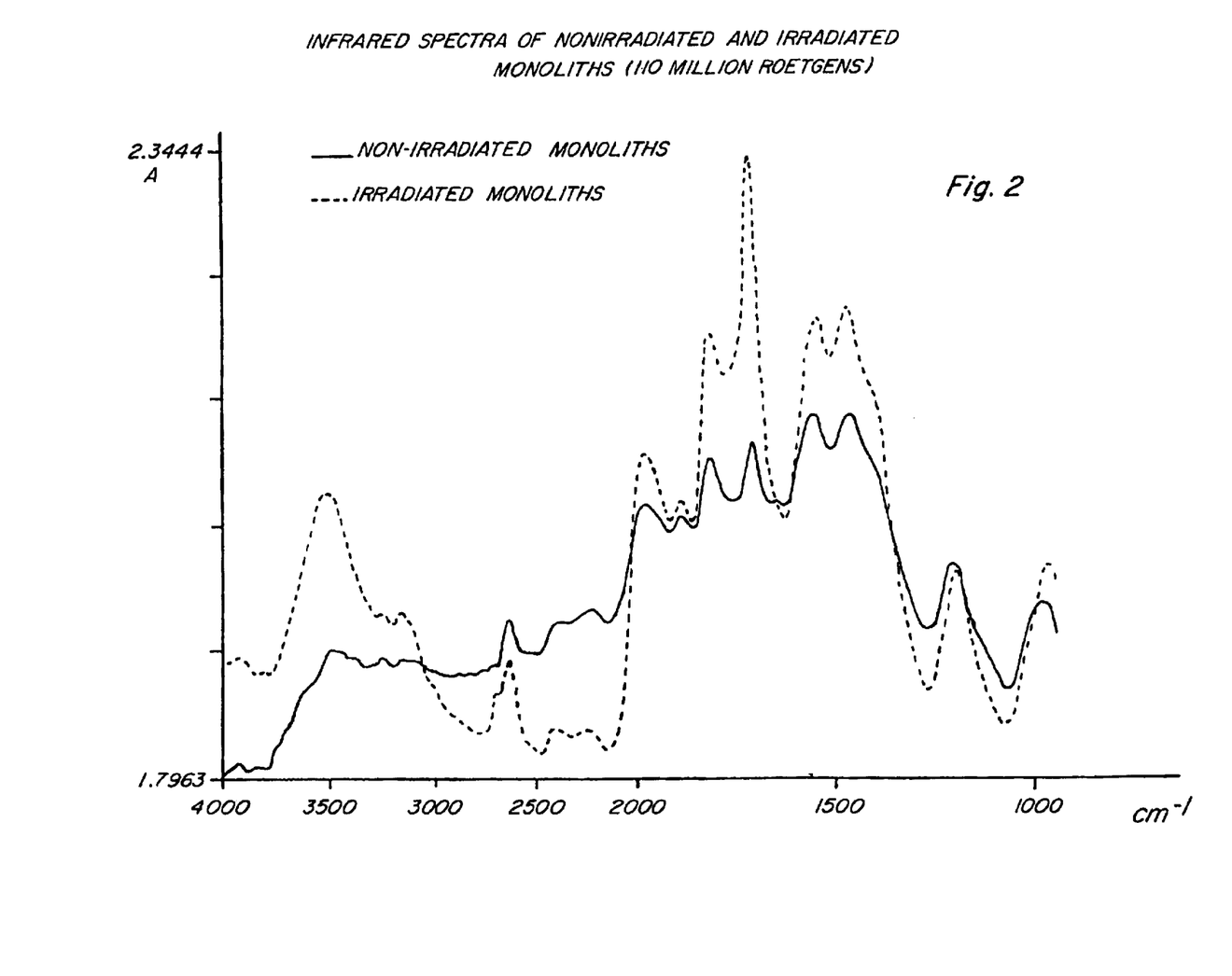

The FTIR data shown in FIGS. 1 and 2 for nonirradiated and irradiated monoliths illustrate that the gamma radiation has not resulted in significant chemical/structural damage to the monolith matrix. Also, the presence of transition elements did not seem to have caused catalytic degradation of the matrix during irradiation. The FTIR spectra were produced using a Perkin-Elmer 1600 FTIR Spectrometer.

Unconfined Compression Strength

The unconfined compression strength (UCS) data given in Table 10 suggests that the gamma radiation has not damaged the mechanical properties of the matrix. The values attained during this testing of approximately 5,000 psi are significantly higher than the regulatory requirement of 60 psi (10 CFR 61).

Biodegradation Studies

Biodegradation studies, to determine 10 CFR 61 compliance, were conducted at the Analytical Biochemistry (ABC) Labs, Columbia, Mo., and the results are seen in Table 11. These tests are of utmost importance, since a matrix vulnerable to biodegradation would result in the release of radio isotopes, bringing catastrophic consequences. Utilizing *pseudomonas aeruginosa* as the test organism, ASTM G22-76 determined that the test organism could not survive on the monolith surfaces. All test samples destroyed the microorganisms with the test period of 21 days.

The UCS tests after biodegradation evaluations revealed no significant change in values.

Thermal cycling, ASTM D3310, between −40° and 60° C. of nonirradiated and irradiated samples did not exhibit either creeping or shrinkage. This indicates a very small value for the coefficient of cubical expansion for the matrix.

The samples were tested, ASTM C1171, for corrosion in an acidic atmosphere and did not undergo perceptible changes, indicating the passive nature of the matrix.

The samples were evaluated, ASTM D3278-78, for fire resistance/flashpoint. In the absence of additives, the vapors of the matrix when subjected to flame were combustible. However, addition of commercially available flame retardant, Firemaster 836™ by Great Lakes at about 6.0% by weight prevented ignition/combustion of the matrix as well as the vapors when exposed to 900°+C.

Energy absorption studies, calibration uncertainty calculations, and data evaluation were done at the Argonne National Laboratories (ANL), Chicago, Ill.

From the foregoing description, those skilled in the art will appreciate that all the objects of the present invention are realized. A polymer composition and method is provided which effectively immobilizes, both chemically and mechanically, radioactive waste materials. The preferred embodiment of the present invention, the polymer/depleted uranium composition effectively encapsulates the depleted uranium, while at the same time providing a radiation shielding material which exceeds all of the mandatory requirements under the 10 CFR 61 regulations.

A polymer/nuclear waste composition is provided which resists structural damage from heavy doses of radiation, does not release combustible gas, produces excellent leach characteristics, and does not undergo biodegradation, acid corrosion, or weathering damage.

A method of safely and economically storing depleted uranium wastes, including those stored under contaminated oil and those including metal ions are provided. Finally, an improved container for storing radioactive waste is provided.

While specific embodiments have been shown and described, many variations are possible. While the present invention has been described as it relates to the treatment of depleted uranium waste products, the composition and methods described herein have other potential uses. These include, but are not limited to, a potential solution for sealing off decommissioned reactors and also to immobilize radioisotopes in soil, tank wastes and other waste forms. Further, the composition and method of the present invention could be advantageously used in combination with isotope retrieval and/or recycling processes.

In addition, while a preferred composition has been described, other components can be added to the composition to customize the composition for a particular application. For example, the composition of the present invention can be utilized to contain high level radioactive radionuclides contained in concrete cribs prior to demolition. However, the composition for this application preferably includes lead dust to provide additional shielding for the personnel during the demolition.

Thus, there has been shown and described several embodiments of a composition and methods for encapsulating radioactive wastes, which composition and method fulfill all of the objects and advantages sought therefore. As is evident from the foregoing description, certain aspects of the present invention are not limited by the particular details of the examples illustrated herein, and it is therefore contemplated that many changes, modifications, variations and other uses and applications of the present invention, including equivalents thereof, will become apparent to those skilled in the art after considering this specification and the accompanying figures. All such changes, modifications, various and other uses and applications which do not depart from the spirit and scope of the invention are deemed to be covered by the invention which is limited only by the claims which follow.

What is claimed is:

1. A polymer composition for radiation shielding comprising:

about 1.2 to 15% at least one isocyanate monomer;

about 1.0 to 14% at least one phenolic resin;

about 0.2 to 1.0% at least one flame retardant compound; and about 80 to 96% depleted uranium, wherein the isocyanate monomer, phenolic resin, and depleted uranium of the composition are combined to form a homogeneous mixture prior to curing of the composition.

2. The polymer composition of claim 1 wherein the isocyanate monomer is an aromatic isocyanate.

3. The polymer composition of claim 1 wherein the phenolic resin is produced by the polycondensation of a phenol compound with formaldehyde.

4. The polymer composition of claim I wherein the depleted uranium is selected from the group consisting of $UO_3$, $UO_2$, $U_3O_8$, and mixtures thereof.

5. The polymer composition of claim 1 further comprising a catalyst.

6. A polymer composition for radiation shielding comprising:

about 1.2 to 15% at least one aromatic isocyanate monomer;

about 1.0 to 14% at least one phenolic resin, the phenolic resin being produced by the polycondensation of a phenol compound with formaldehyde;

about 80 to 96% depleted uranium selected from the group consisting of $UO_3$, $UO_2$, $U_3O_8$ and mixtures thereof;

about 0.2 to 1.0% at least one halogenated phosphate ester flame retardant and about 0 to 1.0% at least one catalyst;

wherein the isocyanate monomer, phenolic resin, and depleted uranium of the composition are combined to form a homogeneous mixture prior to curing of the composition.

7. The polymer composition of claim 6 wherein the aromatic isocyanate monomer is diphenylmethane 4,4'-diisocyanate.

8. The polymer composition of claim 6 wherein the phenolic resin is produced by the polycondensation of phenol with formaldehyde.

9. The polymer composition of claim 6 wherein the catalyst is phenylpropyl pyridine.

10. The polymer composition of claim 6 wherein the halogenated phosphate ester flame retardant is Firemaster 836™.

11. A polymer composition for radiation shielding comprising:

about 2.4% diphenylmethane 4,4'-diisocyanate;

about 3.6% phenolic resin, the phenolic resin being produced by the polycondensation of phenol with formaldehyde;

about 0.6% halogenated phosphate ester; and about 93.4% depleted uranium selected from the group consisting of $UO_3$, $UO_2$, $U_3O_8$ and mixtures thereof;

wherein the diphenylmethane 4,4'-diisocyanate, phenolic resin and depleted uranium of the composition are combined to form a homogeneous mixture prior to curing of the composition.

12. A polymer composition for radiation shielding comprising:
   about 2.4% diphenylmethane 4,4'-diisocyanate;
   about 3.6% phenolic resin, the phenolic resin being produced by the polycondensation of phenol with formaldehyde;
   about 93.25% depleted uranium selected from the group consisting of $UO_3$, $UO_2$, $U_3O_8$ and mixtures thereof;
   about 0.6% halogenated phospate ester and
   about 0.15% phenylpropyl pyridine;
   wherein the diphenylmethane 4,4'-diisocyanate, phenolic resin, depleted uranium and phenypropyl pyridine of the composition are combined to form a homogeneous mixture prior to curing of the composition.

13. The process of making a polymer composition comprising:
   mixing about 1.2 to 15% at least one isocyanate monomer;
   about 1.0 to 14% phenolic resin;
   about 0.2 to 1.0% flame retardant compound; and
   about 80 to 96% depleted uranium, until a homogeneous mixture is formed; and
   allowing the homogeneous mixture to cure.

14. The process of making a polymer composition comprising:
   mixing about 1.2 to 15% at least one aromatic isocyanate monomer;
   about 1.0 to 14% at least one phenolic resin, the phenolic resin being produced by the polycondensation of a phenol with formaldehyde;
   about 80 to 96% depleted uranium selected from the group consisting of $UO_3$, $UO_2$, $U_3O_8$ and mixtures thereof;
   about 0.2 to 1.0% halogenated phosphate ester flame retardant compound; and
   about 0 to 1.0% at least one catalyst until a homogeneous mixture is formed; and
   allowing the homogeneous mixture to cure.

15. The process of making a polymer composition comprising:
   mixing about 2.4% diphenylmethane 4,4'-diisocyanate;
   about 3.6% phenolic resin, the phenolic resin being produced by the polycondensation of phenol with formaldehyde;
   about 0.6% halogenated phosphate ester flame retardant compound and
   about 94% depleted uranium selected from the group consisting of $UO_3$, $UO_2$, $U_3O_8$ and mixtures thereof, until a homogeneous mixture is formed; and
   allowing the homogeneous mixture to cure.

16. The process of making a polymer composition comprising:
   mixing about 2.4% diphenylmethane 4,4'-diisocyanate;
   about 3.6% phenolic resin, the phenolic resin being produced by the polycondensation of phenol with formaldehyde;
   about 93.25% depleted uranium selected from the group consisting of $UO_3$, $UO_2$, $U_3O_8$ and mixtures thereof;
   about 0.6% halogenated phosphate ester flame retardant compound and
   about 0.15% phenylproply pyridine until a homogeneous mixture is formed; and
   allowing the homogeneous mixture to cure.

17. The process of making a polymer composition comprising:
   mixing about 1.2 to 15% at least one aromatic isocyanate monomer;
   about 1.0 to 14% at least one phenolic resin, the phenolic resin being produced by the polycondensation of a phenol with formaldehyde;
   about 0.2 to 1.0% at least one halogenated phosphate ester;
   about 80 to 96% depleted uranium; and
   about 0 to 1.0% at least one catalyst until a homogeneous mixture is formed; and
   allowing the homogeneous mixture to cure.

18. The process of making a polymer composition comprising:
   mixing about 2.4% diphenylmethane 4,4'-diisocyanate;
   about 3.6% phenolic resin, the phenolic resin being produced by the polycondensation of phenol with formaldehyde; and
   about 0.6% halogenated phosphate ester;
   about 93.4% depleted uranium selected from the group consisting of $UO_3$, $UO_2$, $U_3O_8$ and mixtures thereof; and
   allowing the homogeneous mixture to cure.

19. The process of making a polymer composition comprising:
   mixing about 2.4% diphenylmethane 4,4'-diisocyanate;
   about 3.6% phenolic resin, the phenolic resin being produced by the polycondensation of phenol with formaldehyde;
   about 0.6% halogenated phosphate ester;
   about 93.25% depleted uranium selected from the group consisting of $UO_3$, $UO_2$, $U_3O_8$ and mixtures thereof; and
   about 0.15% phenylproply pyridine until a homogeneous mixture is formed; and
   allowing the homogeneous mixture to cure.

* * * * *

UNITED STATES PATENT AND TRADEMARK OFFICE
CERTIFICATE OF CORRECTION

PATENT NO. : 6,805,815 B1
DATED : October 19, 2004
INVENTOR(S) : Soundararajan, Rengarajan

It is certified that error appears in the above-identified patent and that said Letters Patent is hereby corrected as shown below:

Column 20,
Line 19, delete "Claim I" and replace with -- Claim 1 --;

Column 22,
Line 50, delete "phenylproply" and replace with -- phenylpropyl --.

Signed and Sealed this

First Day of February, 2005

JON W. DUDAS
*Director of the United States Patent and Trademark Office*